United States Patent [19]
Murata et al.

[11] Patent Number: 5,964,824
[45] Date of Patent: Oct. 12, 1999

[54] TWO-DIMENSIONAL IDCT CIRCUIT WITH INPUT ADDER OUT OUTPUT SHIFTER FOR REDUCING ADDITION OPERATIONS DURING ROUNDING-UP

[75] Inventors: Eri Murata; Ichiro Kuroda, both of Tokyo, Japan

[73] Assignee: NEC Coporation, Tokyo, Japan

[21] Appl. No.: 08/791,984

[22] Filed: Jan. 31, 1997

[30] Foreign Application Priority Data

Feb. 2, 1996 [JP] Japan ................................ 8-017960

[51] Int. Cl.⁶ ............................................. G06F 17/14
[52] U.S. Cl. ...................... 708/402; 708/400; 708/401
[58] Field of Search ................................ 358/426, 400; 375/261; 364/487, 726, 514 R, 225.02, 725.01, 725.03; 708/400, 403, 401, 402

[56] References Cited

U.S. PATENT DOCUMENTS

| | | | |
|---|---|---|---|
| 5,028,877 | 7/1991 | Muller et al. | 364/726 |
| 5,029,122 | 7/1991 | Uetani | 364/725 |
| 5,216,516 | 6/1993 | Tanaka et al. | 358/426 |
| 5,262,958 | 11/1993 | Chui et al. | 364/487 |
| 5,285,402 | 2/1994 | Keith | 364/725 |
| 5,299,025 | 3/1994 | Shirasawa | 358/400 |
| 5,345,408 | 9/1994 | Hoogenboom | 364/725 |
| 5,438,591 | 8/1995 | Oie et al. | 375/261 |
| 5,477,469 | 12/1995 | Motomura | 364/514 R |
| 5,629,882 | 5/1997 | Iwata | 364/725 |
| 5,671,169 | 9/1997 | Huang | 364/725 |
| 5,764,553 | 6/1998 | Hong | 364/725.01 |
| 5,768,167 | 6/1998 | Kuroda | 264/725.02 |

FOREIGN PATENT DOCUMENTS

| | | |
|---|---|---|
| 1-320572 | 12/1989 | Japan . |
| 4-220081 | 8/1992 | Japan . |
| 6-13914 | 1/1994 | Japan . |
| 6-83586 | 3/1994 | Japan . |

OTHER PUBLICATIONS

Kuroda, "A Study on Fast 2D (I)DCT Algorithm", Proceedings of the 1995 Engineering Sciences Society Conference of IEICE, (1995), p. 88.

Feig, "Fast Algorithms for the Discrete Cosine Transform", IEEE Transactions on Signal Processing, vol. 40, No. 9, (1992), pp. 2174–2193.

Primary Examiner—Joseph E. Palys
Assistant Examiner—Rijue Mai
Attorney, Agent, or Firm—Foley & Larnder

[57] ABSTRACT

The invention provides a high speed two-dimensional discrete cosine transform circuit which can reduce the number of addition operations for rounding to one time. The two-dimensional IDCT circuit calculates M×N-point two-dimensional inverse discrete cosine transforms wherein M×N is equal to $2^{2n}$, and includes an M×N two-dimensional IDCT operator for calculating two-dimensional inverse discrete cosine transforms as matrix vector products of a transform matrix of MN rows and MN columns and MNth-order input vectors, a shift operator for shifting results of the calculation of the M×N two-dimensional IDCT operator rightwardly, and an adder for adding $2^{n-2}$ to a discrete cosine coefficient from among discrete cosine transform coefficients to be inputted to the M×N two-dimensional IDCT operator. An output signal of the shift operator is outputted as a circuit output signal of the two-dimensional IDCT circuit.

8 Claims, 10 Drawing Sheets

TWO-DIMENSIONAL IDCT CIRCUIT WITH INPUT ADDER OUT OUTPUT SHIFTER FOR REDUCING ADDITION OPERATIONS DURING ROUNDING-UP

BACKGROUND OF THE INVENTION

1. Field of the Invention

This invention relates to a two-dimensional IDCT circuit which affects two-dimensional inverse discrete cosine transforms (IDCT's) used for processing of signals such as image signals.

2. Description of the Related Art

As augmentation in performance of microprocessors and signal processors proceeds, those processors can be used to realize image signal processing. Above all, with a microprocessor which has a multiplier or a product sum operator built therein, since a product sum operation can be effected using the same clock number as that for addition and subtraction operations, in order to raise the speed of processing, it is desirable not only to decrease the number of multiplication operations but also to minimize the sum of the numbers of addition and subtraction operations and product sum operations.

In order to realize two-dimensional (inverse) DCT by means of a microprocessor or a signal processor, it is a common practice, because of a restriction in the number of internal registers, to first calculate one-dimensional (inverse) DCT in the direction of a row and store results once into an external memory and then read out the results of the processing in the direction of a row from the memory and perform a one-dimensional (inverse) DCT. In this instance, in order to prevent an increase of the calculation amount or the hardware amount, it is a common practice to process the results of the calculation in the direction of a row with a single precision when it is stored into the external memory. Consequently, errors are produced in calculation. One of the methods of suppressing the total number of product sum operations and addition and multiplication operations while suppressing such operation errors is disclosed in "A Study on Fast 2D (I)DCT Algorithm", Collection of Drafts for the Engineering Sciences Society of the Institute of Electronics, Information and Communication Engineers of Japan in 1995, p.88.

FIG. 10 is in block diagram showing an exemplary one of a conventional two-dimensional IDCT circuit. Referring to FIG. 10, an M×N two-dimensional IDCT operator 2 receives M×N (M and N are natural numbers) DCT coefficients as inputs thereto and effects M×N-point two-dimensional inverse discrete cosine transforms. The M×N two-dimensional IDCT operator 2 calculates to the kth bit of the fraction part, and results of the calculation of the M×N two-dimensional IDCT operator 2 are rounded to integers by an adder 19 and a shift operator 3. To this end, the adder 19 adds 1 to the k−1th bit as counted from the least significant bit for all of output data of the M×N two-dimensional IDCT operator 2. The shift operator 3 shifts the outputs of the adder 19 rightwardly by k bits.

In the conventional circuit described above, in order to round results of calculation calculated to the kth bit of the fraction part, the adder 19 adds 0.5 to all of the M×N data which are the results of the calculation of the M×N two-dimensional IDCT operator 2. Therefore, M×N addition operations are required.

SUMMARY OF THE INVENTION

It is an object of the present invention to provide a high speed two-dimensional IDCT circuit which can reduce the number of addition operations for rounding to one time.

In order to attain the object described above, according to the present invention, there is provided a two-dimensional IDCT circuit for calculating M×N-point two-dimensional inverse discrete cosine transforms wherein M×N is equal to $2^{2n}$, M and N being natural numbers, n being an integer equal to or higher than 1, comprising an M×N two-dimensional IDCT operator for calculating two-dimensional inverse discrete cosine transforms as matrix vector products of a transform matrix of MN rows and MN columns and MNth-order input vectors, a shift operator for shifting results of the calculation of the M×N two-dimensional IDCT operator rightwardly, and an adder for adding $2^{n-2}$ to a discrete cosine coefficient from among discrete cosine transform coefficients to be inputted to the M×N two-dimensional IDCT operator, an output signal of the shift operator being outputted as a circuit output signal of the two-dimensional IDCT circuit.

The two-dimensional IDCT circuit may be constructed such that M and N are 8 and n is 3 such that the M×N two-dimensional IDCT operator is formed as an 8×8 two-dimensional IDCT operator. In this instance, the 8×8 two-dimensional IDCT operator may include a plurality of tensor product operators, a plurality of butterfly operators and a plurality of two-dimensional butterfly operators.

M×N-point two-dimensional IDCT's can be represented by the following expression (1):

expression (2)

$$f(i, j) = \sum_{u=0}^{M-1}\sum_{v=0}^{N-1} r(u, v, i, j)x(u, v) \quad (1)$$

where $$r(u, v, i, j) = \frac{4}{\sqrt{M \cdot N}} c(u)c(v)\cos\frac{(2i+1)u}{2M}\pi\cos\frac{(2j+1)v}{2N}\pi, \quad (2)$$

$$c(k) = \frac{1}{\sqrt{2}}(k = 0), 1(k \neq 0)$$

Here, r(0, 0, i, j) which is a coefficient to x(0, 0) is given by the following expression (3)

$$r(0, 0, i, j) = \frac{2}{\sqrt{M \cdot N}} \quad (3)$$

Accordingly, r(0, 0, i, j) is a constant independent of the values of i and j. In order to shift f(i, j) calculated to the kth bit of the fraction part rightwardly by k bits at the last stage, 1 for rounding is added to a value which corresponds to 0.5, that is, to the k−1th bit as counted from the least significant bit. Since the addition of 0.5 to f(i,j) is equivalent to addition of 0.5 in advance to the first term of the sum total of the right side of the expression (1), the first term is given as the following expression (4):

$$r(0, 0, i, j)\cdot x(0, 0) + 0.5 = \frac{2}{\sqrt{M \cdot N}}\left(x(0, 0) + \frac{\sqrt{M \cdot N}}{4}\right) \quad (4)$$

Accordingly, the first term has a value independent of i and j. Further, when the value of M·N is $2^{2n}$, the first term is given as $2^{1-n}(x(0, 0)+2^{n-2})$.

In this manner, in the M×N-point two-dimensional IDCT calculations, addition of $2^{n-2}$ to x(0, 0) which is the DC coefficient in the inputs is equivalent to addition of 1 to the k−1th bit as counted from the least significant bit of all f(i, j). Consequently, the number of addition operations for rounding can be reduced from M×N times to one time.

Consequently, with the two-dimensional IDCT circuit of the present invention, in calculation of M×N-point two-dimensional inverse discrete cosine transforms wherein M×N is equal to $2^{2n}$, a similar effect equivalent to that which is achieved by performing addition operations for rounding for all results of calculation can be achieved by one addition operation. Consequently, two-dimensional IDCT operations can be performed at a high speed.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
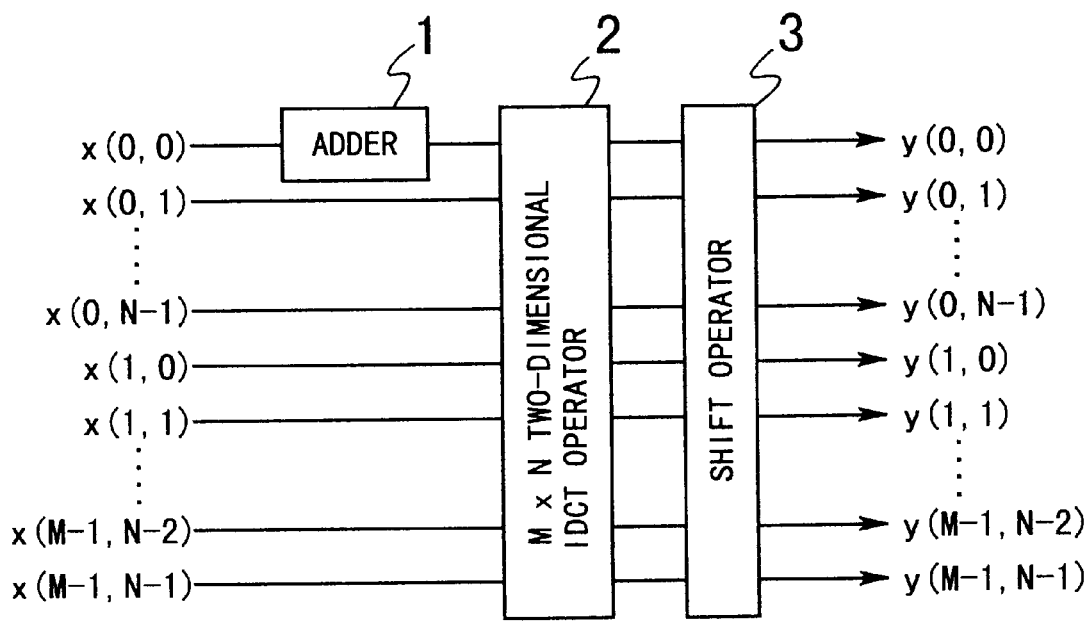
FIG. 1 is a block diagram of a two-dimensional IDCT circuit showing a preferred embodiment of the present invention.
Figure 2:
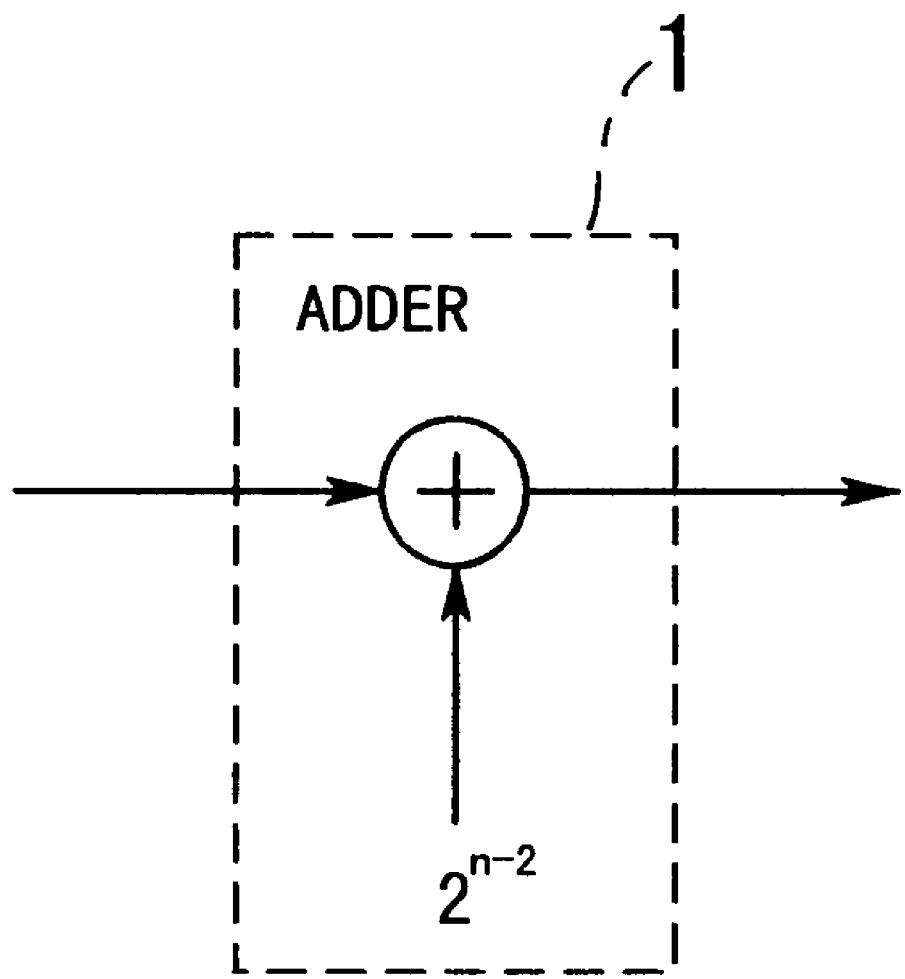
FIG. 2 is a diagrammatic view illustrating an operation of an adder shown in FIG. 1.
Figure 3:
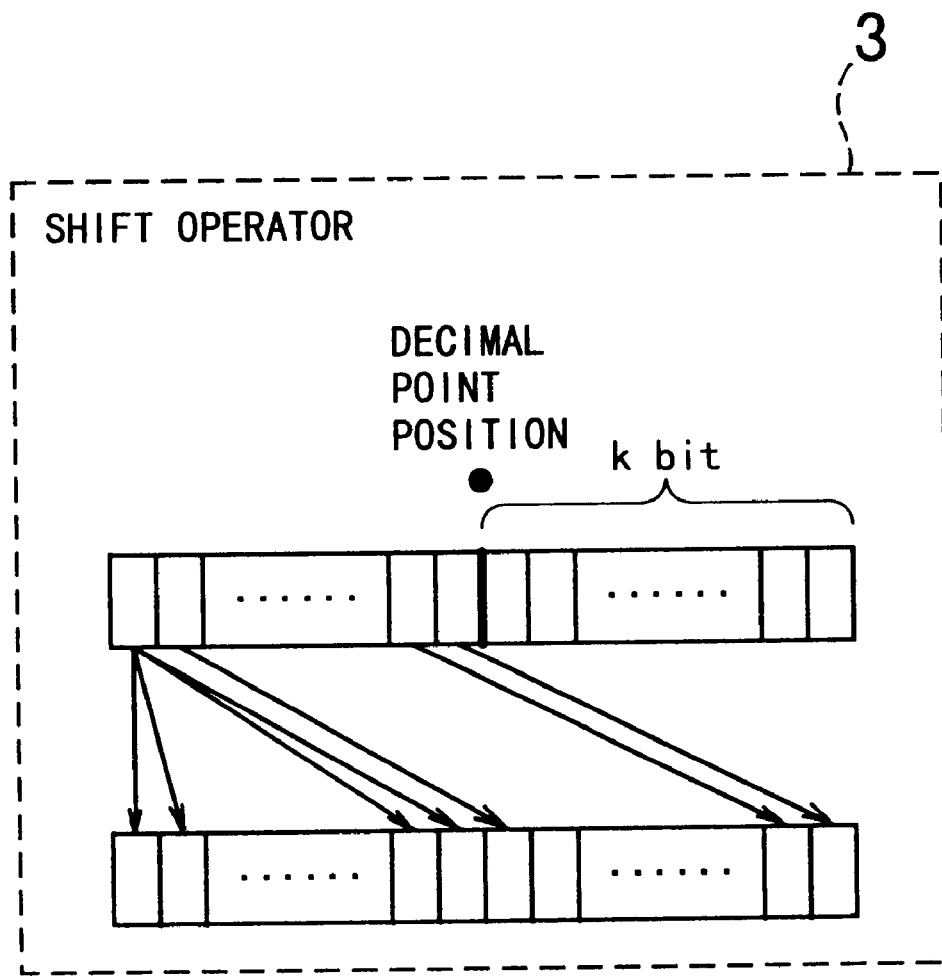
FIG. 3 is a diagrammatic view illustrating operation of a shift operator shown in FIG. 1.

FIG. 1 shows in block diagram an M×N two-dimensional IDCT circuit to which the present invention is applied. In the following description, u and v are integers between 0 and N−1 and M−1, respectively, and a DCT coefficient whose address in a vertical direction is u and whose address in a horizontal direction is v is x(u, v). Referring to FIG. 1, an adder 1 receives a DCT coefficient x(0, 0) from among input DCT coefficients to the M×N two-dimensional IDCT circuit and adds $2^{n-2}$ to the DCT coefficient x(0, 0) as seen in FIG. 2. An M×N two-dimensional IDCT operator 2 receives an output of the adder 1 and the DCT coefficients x(0, 1) to x(M−1, N−1) as inputs thereto and effects M×N two-dimensional inverse discrete cosine transforms. The M×N two-dimensional IDCT operator 2 calculates to the kth bit of the fraction part. A shift operator 3 arithmetically shifts and outputs results of the calculation of the M×N two-dimensional IDCT operator 2 calculated to the kth bit of the fraction part rightwardly by k bits.

Figure 4:
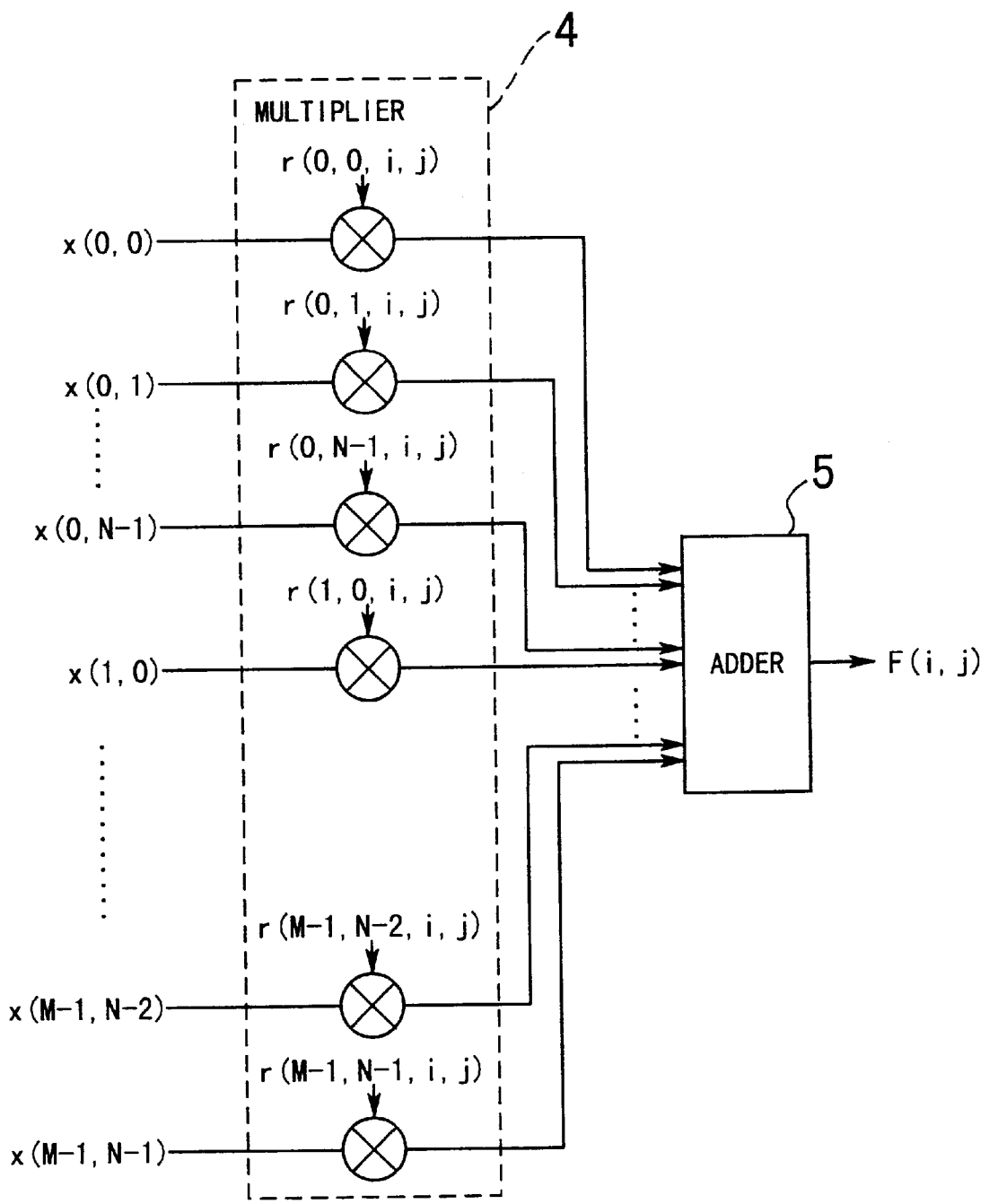
FIG. 4 is a block diagram showing a form of an M×N two-dimensional IDCT operator shown in FIG. 1.

FIG. 4 shows a form of the M×N two-dimensional IDCT operator 2. Referring to FIG. 4, a multiplier 4 receives M×N DCT coefficients from x(0, 0) to x(M−1, N−1) as inputs thereto and multiplies the input data x(u, v) by multiplication coefficients r(u, v, i, j). An adder 5 adds all of the M×N multiplication results of the multiplier 4 to obtain an IDCT operation result f(i, j).

The M×N two-dimensional IDCT operator 2 may adopt any calculation method only if two-dimensional IDCT's are calculated as a matrix vector product of a transform matrix of MN rows and MN columns and MNth-order input vectors.

Figure 5:
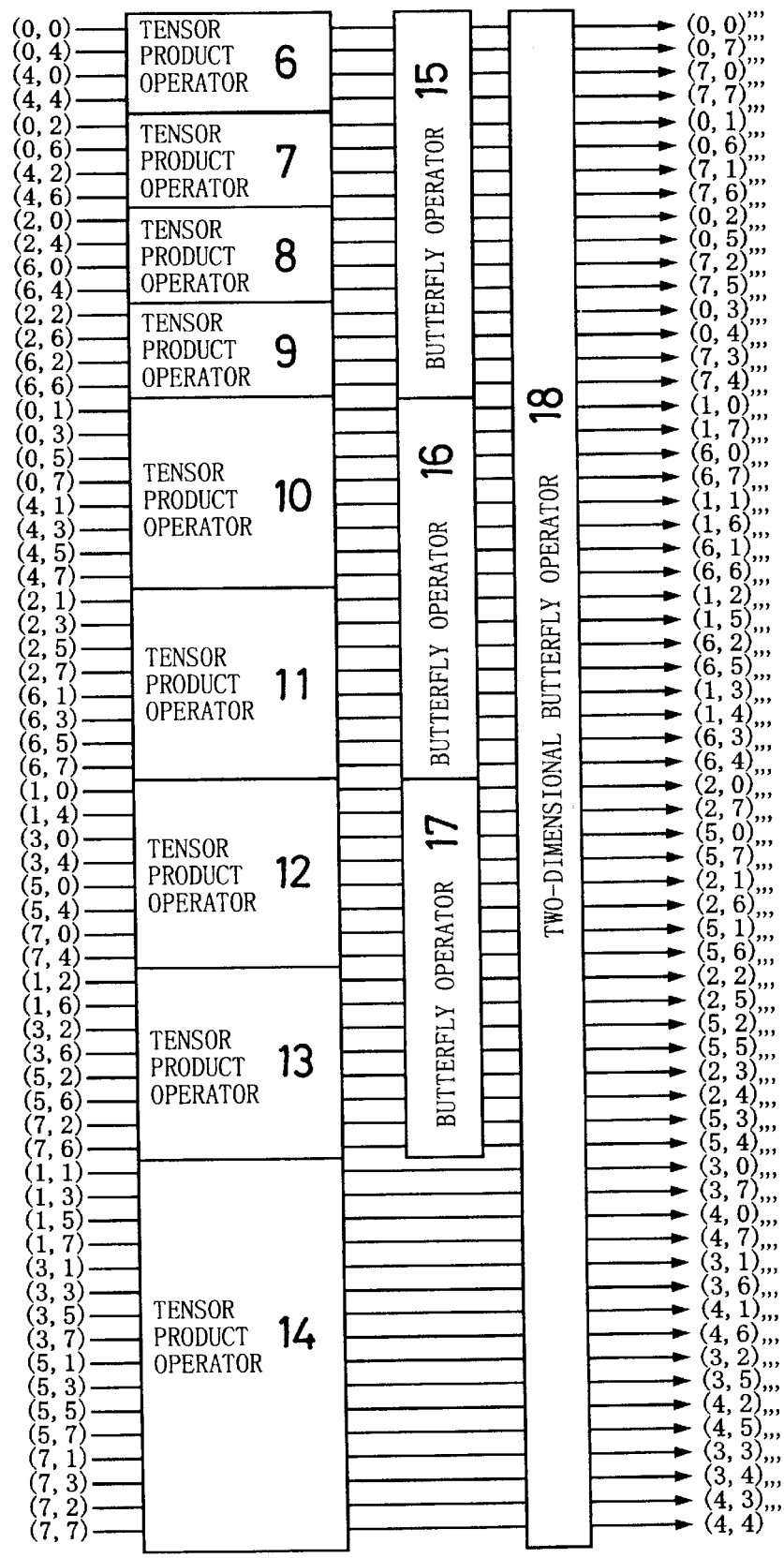
FIG. 5 is a block diagram showing a form of an 8×8-point two-dimensional IDCT operation circuit.

For example, a form of the M×N two-dimensional IDCT operator 2 which employs the system disclosed in the aforementioned Collection of Drafts for the Meeting of the Base-Boundary Society of the Electronic Information Communication Society of Japan in 1995, p.88 and in which M=N=8 is shown in FIG. 5. Referring to FIG. 5, the 8×8 two-dimensional IDCT operator shown includes tensor product operators 6 to 14, a pair of butterfly operators 16 and 17, and a pair of two-dimensional butterfly operators 15 and 18.

Where Cuv={(cos2πu)/32}·{(cos2πv)/32}, the tensor product operator 6 receives DCT coefficients (0, 0), (0, 4), (4, 0) and (4, 4) as inputs thereto and performs a matrix vector calculation of them with a 4×4 matrix represented by the following expression (5):

$$\begin{pmatrix} C44 & C44 & C44 & C44 \\ C44 & -C44 & C44 & -C44 \\ C44 & C44 & -C44 & -C44 \\ C44 & -C44 & -C44 & C44 \end{pmatrix} \quad (5)$$

The tensor product operator 7 receives DCT coefficients (0, 2), (0, 6), (4, 2) and (4, 6) as inputs thereto and performs a matrix vector calculation of them with another 4×4 matrix represented by the following expression (6):

$$\begin{pmatrix} C42 & C46 & C42 & C46 \\ C46 & -C42 & C46 & -C42 \\ C42 & C46 & -C42 & -C46 \\ C46 & -C42 & -C46 & C42 \end{pmatrix} \quad (6)$$

The tensor product calculator 8 receives DCT coefficients (2, 0), (2, 4), (6, 0) and (6, 4) as inputs thereto and performs a matrix vector calculation of them with a further 4×4 matrix represented by the following expression (7):

$$\begin{pmatrix} C24 & C24 & C64 & C64 \\ C24 & -C24 & C64 & -C64 \\ C64 & C64 & -C24 & -C24 \\ C64 & -C64 & -C24 & C24 \end{pmatrix} \quad (7)$$

The tensor product operator 9 receives DCT coefficients (2, 2), (2, 6), (6, 2) and (6, 6) as inputs thereto and performs a matrix vector calculation of them with a still further 4×4 matrix represented by the following expression (8):

$$\begin{pmatrix} C22 & C26 & C62 & C66 \\ C26 & -C22 & C66 & -C62 \\ C62 & C66 & -C22 & -C26 \\ C66 & -C62 & -C26 & C22 \end{pmatrix} \quad (8)$$

The tensor product operator 10 receives DCT coefficients (0, 1), (0, 3), (0, 5), (0, 7), (4, 1), (4, 3), (4, 5) and (4, 7) as inputs thereto and performs a matrix vector calculation of them with an 8×8 matrix represented by the following expression (9):

$$\begin{pmatrix} C41 & C43 & C45 & C47 & C41 & C43 & C45 & C47 \\ C43 & -C47 & -C41 & -C45 & C43 & -C47 & -C41 & -C45 \\ C45 & -C41 & C47 & C43 & C45 & -C41 & C47 & C43 \\ C47 & -C45 & C43 & -C41 & C47 & -C45 & C43 & -C41 \\ C41 & C43 & C45 & C47 & -C41 & -C43 & -C45 & -C47 \\ C43 & -C47 & -C41 & -C45 & -C43 & C47 & C41 & C45 \\ C45 & -C41 & C47 & C43 & -C45 & C41 & -C47 & -C43 \\ C47 & -C45 & C43 & -C41 & -C47 & C45 & -C43 & C41 \end{pmatrix} \quad (9)$$

The tensor product operator 11 receives DCT coefficients (2, 1), (2, 3), (2, 5), (2, 7), (6, 1), (6, 3), (6, 5) and (6, 7) as inputs thereto and performs a matrix vector calculation of them with another 8×8 matrix represented by the following expression (10):

$$\begin{pmatrix} C21 & C23 & C25 & C27 & C61 & C63 & C65 & C67 \\ C23 & -C27 & -C21 & -C25 & C63 & -C67 & -C61 & -C65 \\ C25 & -C21 & C27 & C23 & C65 & -C61 & C67 & C63 \\ C27 & -C25 & C23 & -C21 & C67 & -C65 & C63 & -C61 \\ C61 & C63 & C65 & C67 & -C21 & -C23 & -C25 & -C27 \\ C63 & -C67 & -C61 & -C65 & -C23 & C27 & C21 & C25 \\ C65 & -C61 & C67 & C63 & -C25 & C21 & -C27 & -C23 \\ C67 & -C65 & C63 & -C61 & -C27 & C25 & -C23 & C21 \end{pmatrix} \quad (10)$$

The tensor product operator 12 receives DCT coefficients (1, 0), (1, 4), (3, 0), (3, 4), (5, 0), (5, 4), (7, 0) and (7, 4) as inputs thereto and performs a matrix vector calculation of them with a further 8×8 matrix represented by the following expression (11):

$$\begin{pmatrix} C14 & C14 & C34 & C34 & C54 & C54 & C74 & C74 \\ C14 & -C14 & C34 & -C34 & C54 & -C54 & C74 & -C74 \\ C34 & C34 & -C74 & -C74 & -C14 & -C14 & -C54 & -C54 \\ C34 & -C34 & -C74 & C74 & -C14 & C14 & -C54 & C54 \\ C54 & C54 & -C14 & -C14 & C74 & C74 & C34 & C34 \\ C54 & -C54 & -C14 & C14 & C74 & -C74 & C34 & -C34 \\ C74 & C74 & -C54 & -C54 & C34 & C34 & -C14 & -C14 \\ C74 & -C74 & -C54 & C54 & C34 & -C34 & -C14 & C14 \end{pmatrix} \quad (11)$$

The tensor product operator 13 receives DCT coefficients (1, 2), (1, 6), (3, 2), (3, 6), (5, 2), (5, 6), (7, 2) and (7, 6) as inputs thereto and performs a matrix vector calculation of them with a still further 8×8 matrix represented by the following expression (12):

$$\begin{pmatrix} C12 & C16 & C32 & C36 & C52 & C56 & C72 & C76 \\ C16 & -C12 & C36 & -C32 & C56 & -C52 & C76 & -C72 \\ C32 & C36 & -C72 & -C76 & -C12 & -C16 & -C52 & -C56 \\ C36 & -C32 & -C76 & C72 & -C16 & C12 & -C56 & C52 \\ C52 & C56 & -C12 & -C16 & C72 & C76 & C32 & C36 \\ C56 & -C52 & -C16 & C12 & C76 & -C72 & C36 & -C32 \\ C72 & C76 & -C52 & -C56 & C32 & C36 & -C12 & -C16 \\ C76 & -C72 & -C56 & C52 & C36 & -C32 & -C16 & C12 \end{pmatrix} \quad (12)$$

The tensor product operator 14 receives DCT coefficients (1, 1), (1, 3), (1, 5), (1, 7), (3, 1), (3, 3), (3, 5), (3, 7), (5, 1), (5, 3), (5, 5), (5, 7), (7, 1), (7, 3), (7, 5) and (7, 7) as inputs thereto and performs a matrix vector calculation of them with another 16×16 matrix represented by the following expression (13):

$$\begin{pmatrix} C11 & C13 & C15 & C17 & C31 & C33 & C35 & C37 & C51 & C53 & C55 & C57 & C71 & C73 & C75 & C77 \\ C13 & -C17 & -C11 & -C15 & C33 & -C37 & -C31 & -C35 & C53 & -C57 & -C51 & -C55 & C73 & -C77 & -C71 & -C75 \\ C15 & -C11 & C17 & C13 & C35 & -C31 & C37 & C33 & C55 & -C51 & C57 & C53 & C75 & -C71 & C77 & C73 \\ C17 & -C15 & C13 & -C11 & C37 & -C35 & C33 & -C31 & C57 & -C55 & C53 & -C51 & C77 & -C75 & C73 & -C71 \\ C31 & C33 & C35 & C37 & -C71 & -C73 & -C75 & -C77 & -C11 & -C13 & -C15 & -C17 & -C51 & -C53 & -C55 & -C57 \\ C33 & -C37 & -C31 & -C35 & -C73 & C77 & C71 & C75 & -C13 & C17 & C11 & C15 & -C53 & C57 & C51 & C55 \\ C35 & -C31 & C37 & C33 & -C75 & C71 & -C77 & -C73 & -C15 & C11 & -C17 & -C13 & -C55 & C51 & -C57 & -C53 \\ C37 & -C35 & C33 & -C31 & -C77 & C75 & -C73 & C71 & -C17 & C15 & -C13 & C11 & -C57 & C55 & -C53 & C51 \\ C51 & C53 & C55 & C57 & -C11 & -C13 & -C15 & -C17 & C71 & C73 & C75 & C77 & C31 & C33 & C35 & C37 \\ C53 & -C57 & -C51 & -C55 & -C13 & C17 & C11 & C15 & C73 & -C77 & -C71 & -C75 & C33 & -C37 & -C31 & -C35 \\ C55 & -C51 & C57 & C53 & -C15 & C11 & -C17 & -C13 & C75 & -C71 & C77 & C73 & C35 & -C31 & C37 & C33 \\ C57 & -C55 & C53 & -C51 & -C17 & C15 & -C13 & C11 & C77 & -C75 & C73 & -C71 & C37 & -C35 & C33 & -C31 \\ C71 & C73 & C75 & C77 & -C51 & -C53 & -C55 & -C57 & C31 & C33 & C35 & C37 & -C11 & -C13 & -C15 & -C17 \\ C73 & -C77 & -C71 & -C75 & -C53 & C57 & C51 & C55 & C33 & -C37 & -C31 & -C35 & -C13 & C17 & C11 & C15 \\ C75 & -C71 & C77 & C73 & -C55 & C51 & -C57 & -C53 & C35 & -C31 & C37 & C33 & -C15 & C11 & -C17 & -C13 \\ C77 & -C75 & C73 & -C71 & -C57 & C55 & -C53 & C51 & C37 & -C35 & C33 & -C31 & -C17 & C15 & -C13 & C11 \end{pmatrix} \quad (13)$$

Figure 6:
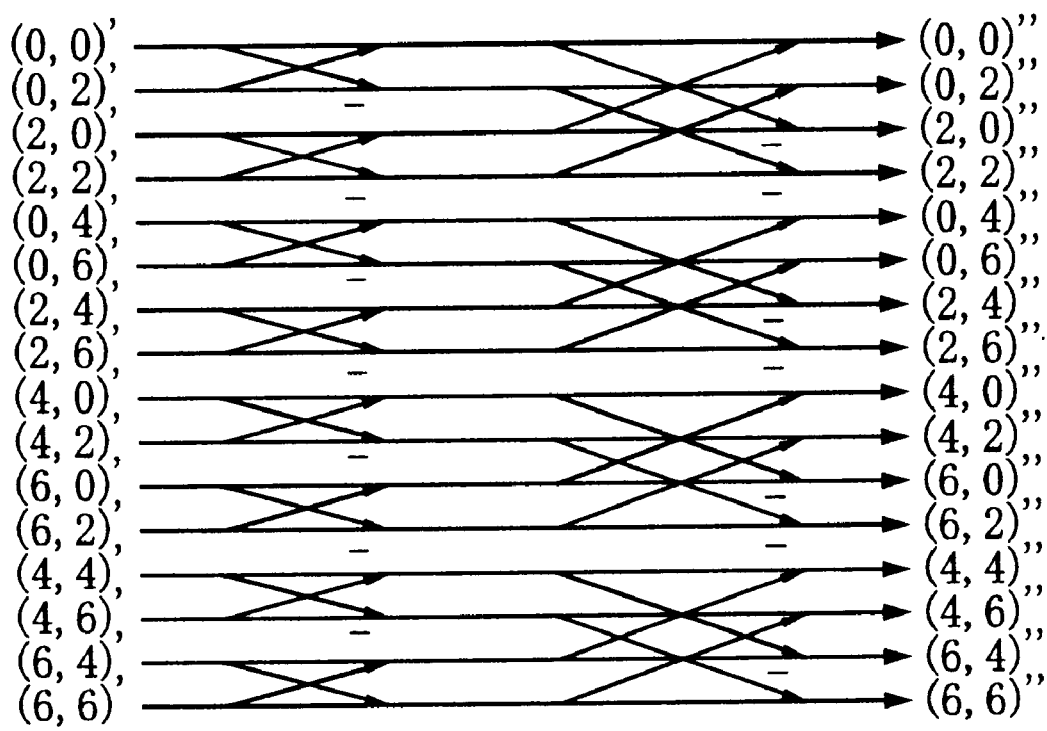
FIG. 6 is a diagrammatic view illustrating an operation performed by a 4×4-point two-dimensional butterfly operator shown in FIG. 5.
Figure 7:
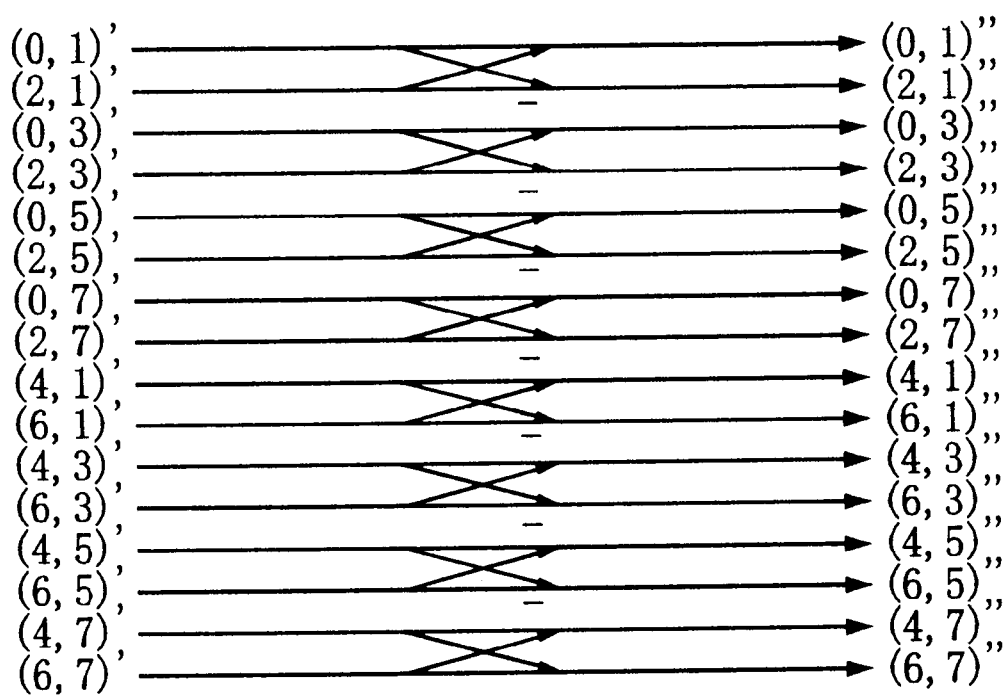
FIG. 7 is a similar view but illustrating an operation performed by a butterfly operator shown in FIG. 5.
Figure 8:
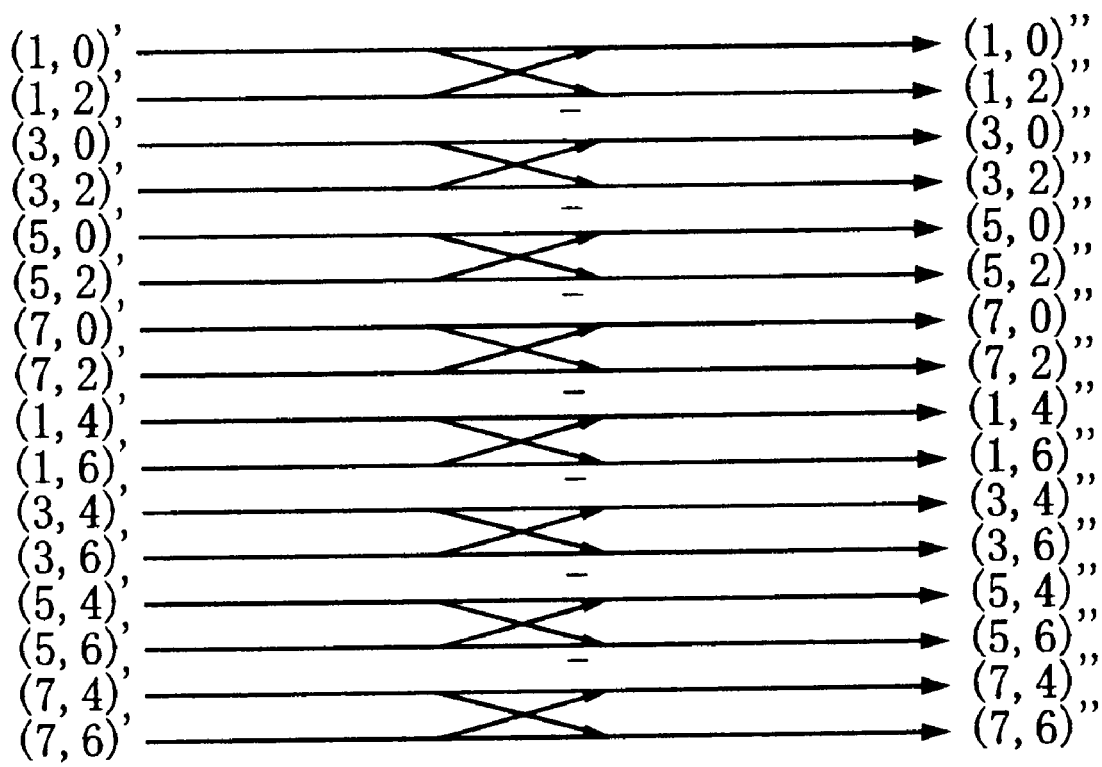
FIG. 8 is a similar view but illustrating an operation performed by another butterfly operator shown in FIG. 5.
Figure 9:
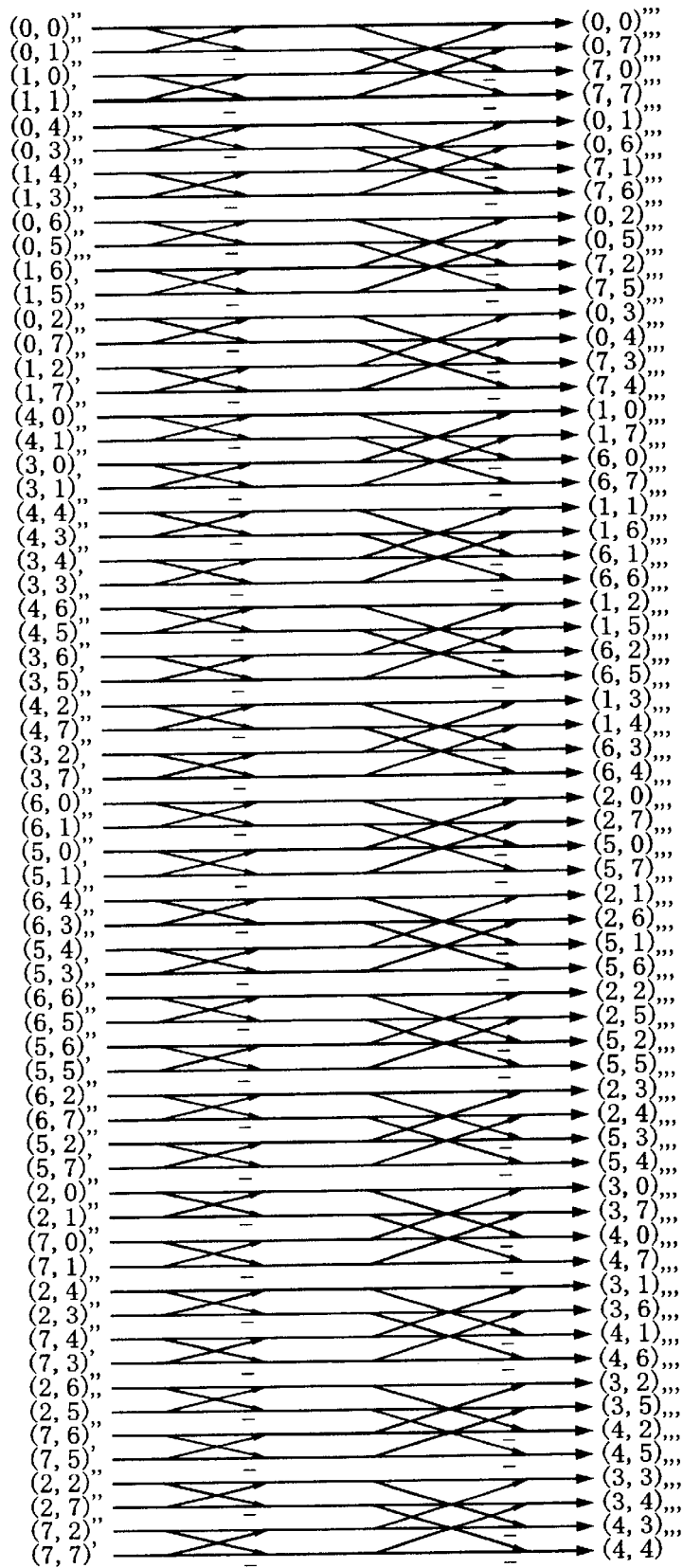
FIG. 9 is a diagrammatic view illustrating an operation performed by a two-dimensional butterfly operator shown in FIG. 5.
Figure 10:
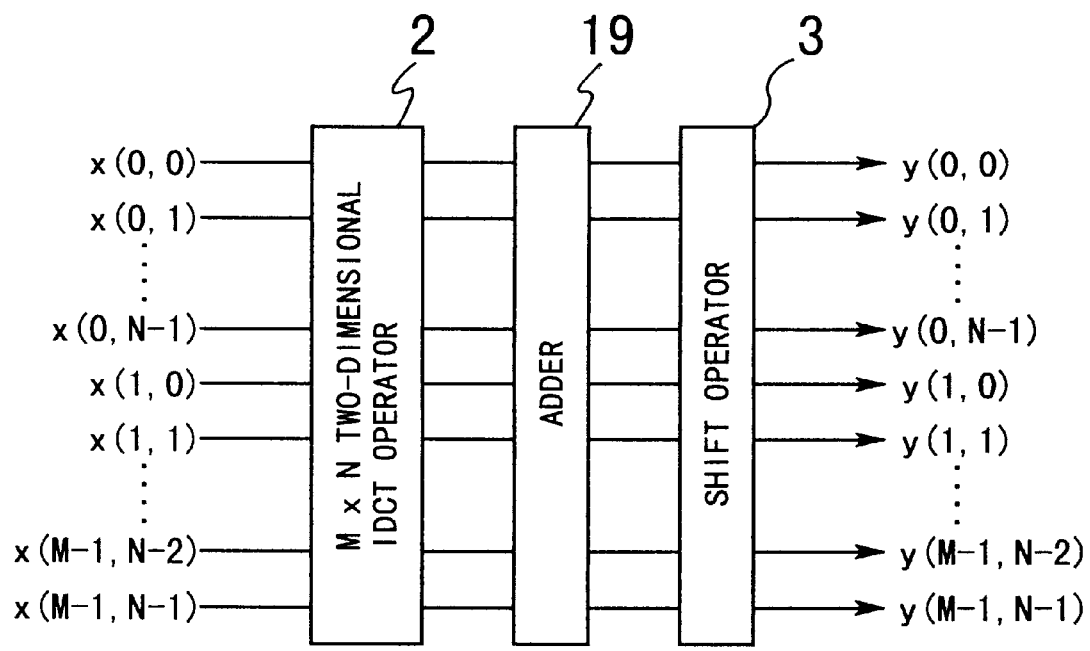
FIG. 10 is a block diagram showing a conventional two-dimensional IDCT circuit.

The two-dimensional butterfly operator 15 receives results of the operations of the tensor product operators 6, 7, 8 and 9 as inputs thereto and performs processing represented by a flow graph of FIG. 6. The butterfly operator 16 inputs results of the operations of the tensor product operators 10 and 11 as inputs thereto and performs processing represented by a flow graph of FIG. 7. The butterfly operator 17 receives results of the operations of the tensor product operators 12 and 13 as inputs thereto and performs processing represented by a flow graph of FIG. 8. The two-dimensional butterfly operator 18 receives results of the operations of the two-dimensional butterfly operator 15 and the butterfly operators 16 and 17 as inputs thereto and performs processing represented by a flow graph of FIG. 9.

Having now fully described the invention, it will be apparent to one of ordinary skill in the art that many changes and modifications can be made thereto without departing from the spirit and scope of the invention as set forth herein.

What is claimed is:

1. A two-dimensional IDCT circuit for calculating M×N-point two-dimensional inverse discrete cosine transforms wherein M×N is equal to $2^{2n}$, M and N being natural numbers, n being an integer equal to or higher than 1, comprising:

an M×N two-dimensional IDCT operator for calculating two-dimensional inverse discrete cosine transforms as matrix vector products of a transform matrix of MN rows and MN columns and MNth-order input vectors;

a shift operator for shifting results of the calculation of said M×N two-dimensional IDCT operator rightwardly; and an adder for adding $2^{n-2}$ to a discrete cosine coefficient from among discrete cosine transform coefficients to be inputted to said M×N two-dimensional IDCT operator;

an output signal of said shift operator being outputted as a circuit output signal of said two-dimensional IDCT circuit.

2. A two-dimensional IDCT circuit as claimed in claim 1, wherein M and N are 8 and n is 3 such that said M×N two-dimensional IDCT operator is formed as an 8×8 two-dimensional IDCT operator.

3. A two-dimensional IDCT circuit as claimed in claim 2, wherein said 8×8 two-dimensional IDCT operator includes a plurality of tensor product operators, a plurality of butterfly operators and a plurality of two-dimensional butterfly operators.

4. A two-dimensional IDCT circuit as claimed in claim 1, wherein said added value of $2^{n-2}$ is added to the DC coefficient for input to the M×N two-dimensional IDCT operator.

5. A two-dimensional IDCT circuit as claimed in claim 1, wherein said M×N two-dimensional IDCT operator includes a plurality of tensor product operators, a plurality of butterfly operators and a plurality of two-dimensional butterfly operators.

6. A two-dimensional IDCT circuit as claimed in claim 1 wherein said adder performs a round-off of said discrete cosine component of said input, and wherein said round-off is performed no more than once per each set of said discrete cosine transform coefficients.

7. A two-dimensional IDCT circuit as claimed in claim 6 wherein said set of said discrete cosine transform coefficients comprises one of said M×N-point two-dimensional inverse discrete cosine transforms.

8. A two-dimensional IDCT circuit as claimed in claim 7 wherein said discrete cosine component, that said round-off is performed upon, is said discrete cosine coefficient that said value of $2^{n-2}$ is added thereto by said adder.

* * * * *